(12) United States Patent
Maehara

(10) Patent No.: US 7,733,032 B2
(45) Date of Patent: Jun. 8, 2010

(54) OLED DRIVER AND LIGHTING APPARATUS EQUIPPED WITH THE SAME

(75) Inventor: Minoru Maehara, Matsubara (JP)

(73) Assignee: Panasonic Electric Works Co., Ltd., Kadoma-Shi (JP)

( * ) Notice: Subject to any disclaimer, the term of this patent is extended or adjusted under 35 U.S.C. 154(b) by 0 days.

(21) Appl. No.: 12/084,031

(22) PCT Filed: Oct. 24, 2006

(86) PCT No.: PCT/JP2006/321146

§ 371 (c)(1),
(2), (4) Date: Feb. 26, 2009

(87) PCT Pub. No.: WO2007/049606

PCT Pub. Date: May 3, 2007

(65) Prior Publication Data
US 2009/0212715 A1 Aug. 27, 2009

(30) Foreign Application Priority Data
Oct. 26, 2005 (JP) .............................. 2005-311972

(51) Int. Cl.
*H05B 37/02* (2006.01)
(52) U.S. Cl. .................... 315/291; 315/225; 315/360
(58) Field of Classification Search ............. 315/209 R, 315/224, 225, 291, 307, 360; 345/76, 82
See application file for complete search history.

(56) References Cited

U.S. PATENT DOCUMENTS

| | | | |
|---|---|---|---|
| 6,008,588 A | 12/1999 | Fujii et al. | |
| 7,202,608 B2 * | 4/2007 | Robinson et al. | 315/224 |
| 7,329,998 B2 * | 2/2008 | Jungwirth | 315/291 |
| 7,332,879 B2 * | 2/2008 | Kung et al. | 315/307 |
| 7,358,681 B2 * | 4/2008 | Robinson et al. | 315/224 |
| 7,550,932 B2 * | 6/2009 | Kung et al. | 315/307 |

(Continued)

FOREIGN PATENT DOCUMENTS

EP  1 085 496  3/2001

(Continued)

OTHER PUBLICATIONS

International Search report, dated Dec. 26, 2006.

(Continued)

*Primary Examiner*—Thuy Vinh Tran
(74) *Attorney, Agent, or Firm*—Edwards Angell Palmer & Dodge LLP

(57) ABSTRACT

An OLED driver for driving at least one organic electroluminescence element and lighting apparatus equipped with the driver. The driver has a direct-current power source and a dimmer. The source alternately applies first voltage and second voltage across the element. The first voltage is approximately equal to drive voltage of the element. The second voltage is lower than the first voltage and higher than barrier voltage of the element. The dimmer controls the source so as to change a ratio of a first term to a second term to dimm the element. The first term is a period of time for which the first voltage is applied across the element. The second term is a period of time for which the second voltage is applied across the element.

8 Claims, 5 Drawing Sheets

U.S. PATENT DOCUMENTS 7,592,985 B2 * 9/2009 Kim et al. .................... 345/82

FOREIGN PATENT DOCUMENTS

| JP | 5-307996 | 11/1993 |
|---|---|---|
| JP | 09-212128 | 8/1997 |
| JP | 3432986 | 8/1997 |
| JP | 10-199674 | 7/1998 |
| JP | 2001-85159 | 3/2001 |
| JP | 2005-78828 | 3/2005 |
| JP | 2005-149744 | 6/2005 |

OTHER PUBLICATIONS

Korean Office Action dated Feb. 25, 2010, issued in Korean Patent Application No. 10-2008-7010117.

* cited by examiner

OLED DRIVER AND LIGHTING APPARATUS EQUIPPED WITH THE SAME

CROSS REFERENCE TO RELATED APPLICATIONS

This Application is a National Phase Application filed under 35 U.S.C. 371 claiming the benefit of PCT/JP2006/321146 filed on Oct. 24, 2006, which has a priority based on a Japan Application No. 2005-311972 filed on Oct. 26, 2005.

TECHNICAL FIELD

The invention relates to generally OLED drivers and more particularly to an OLED driver for driving at least one organic electroluminescence element and lighting apparatus equipped with the driver.

BACKGROUND ART

In this sort of lighting apparatus, at least one organic electroluminescence element is driven at low drive voltage (e.g., about a few to 10 s V) in comparison with discharge lamps. The element is hereinafter also referred to as an organic EL element or an OLED (Organic Light Emitting Diode). Accordingly, since OLED drivers can be produced at low cost in comparison with prior art ballasts, various OLED drivers have been proposed.

For example, Japanese Patent Publication No. 2005-78828 discloses lighting apparatus. The apparatus includes an organic EL element(s), a converting means, a switching means and a controlling means. The converting means is formed of a full wave rectifying circuit and a smoothing circuit, and converts alternating-current power into direct-current power. The switching means has four transistors constituting a full-bridge circuit. This switching means produces an alternating electric current from the direct-current power to supply the element with a forward direction current and a reverse direction current alternately. The controlling means detects an electric current flowing through the element through a detection resistor connected in series with the element, and turns the transistors on and off based on the detected electric current. For example, the controlling means adjusts a duty ratio with respect to the transistors in accordance with a designated luminance value. Specifically, in case that the luminance is raised, the duty ratio is increased so as to lengthen a supply time of the forward direction current to the element. Conversely, in case that the luminance is lowered, the duty ratio is decreased so as to shorten a supply time of the forward direction current to the element. Besides, in order to extend life of the element and prevent noise from circuit parts and visible flicker, a switching frequency for turning the transistors on and off is set to a higher frequency than that of a commercial power source (e.g., 50 or 60 Hz), preferably 20 kHz or more.

Japanese Patent No. 3432986 discloses an organic EL display device. Before applying emission drive voltage across an organic EL element, the device applies auxiliary voltage to the element. The auxiliary voltage is lower than the emission drive voltage and higher than barrier voltage of the element.

Incidentally, as described in Japanese Patent Publication No. 2005-78828, if the switching frequency of a power source for an organic EL element(s) can be set to a higher frequency than that of a commercial power source, especially twice or more, preferably a few hundreds Hz or more, visible flicker can be prevented. Further, if the switching frequency can be set to 20 kHz or more, noise can be prevented. However, in case that the element is supplied with square-wave voltage of which polarity is periodically inverted, it is difficult to set the switching frequency to such a high frequency. That is, an organic EL element has a capacity component owing to the structure and therefore has the circuit structure that the capacity component is connected in parallel thereto. Because of this, if the switching frequency is raised as stated above, voltage polarity is inverted during charging the capacity component and then an electric charge of the component is discharged. Accordingly, there is a possibility that the element cannot emit enough light. For example, since the capacity component of an organic EL element that is a few centimeters square is generally within a range from a few tenth F to a few µF, the switching frequency can be limited to a few kHz or less. For that reason, a switching frequency for generating the square-wave voltage cannot be so high.

DISCLOSURE OF THE INVENTION

It is an object of the present invention to raise a frequency of voltage periodically applied to at least one organic electroluminescence element without reducing luminance of the element.

In order to drive at least one organic electroluminescence element, an OLED driver of the present invention comprises a direct-current power source and a dimmer. The source alternately applies first voltage and second voltage to the element. The first voltage is approximately equal to drive voltage of the element, while the second voltage is lower than the first voltage and higher than barrier voltage of the element. The dimmer controls the source so as to change a ratio of a first term to a second term to dimm the element. The first term is a period of time for which the first voltage is applied to the element. The second term is a period of time for which the second voltage is applied to the element. In this structure, the element is supplied with the second voltage higher than the barrier voltage of the element during the second term. Accordingly, when the second term is switched to the first term, the response of the element can be improved.

In one aspect of the present invention, the dimmer controls the source so that a sum of the first and second terms is kept constant.

In another aspect of the present invention, the dimmer controls the source so as to keep the second term constant.

In other aspect of the present invention, the driver comprises a means that calculates the second voltage based on voltage applied to the element and an electric current flowing through the element when the element emits light. In case of this invention, the response of the element can be optimized and it is possible to more raise a frequency of voltage periodically applied to the element.

Lighting apparatus of the present invention comprises said OLED driver and the at least one organic electroluminescence element.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
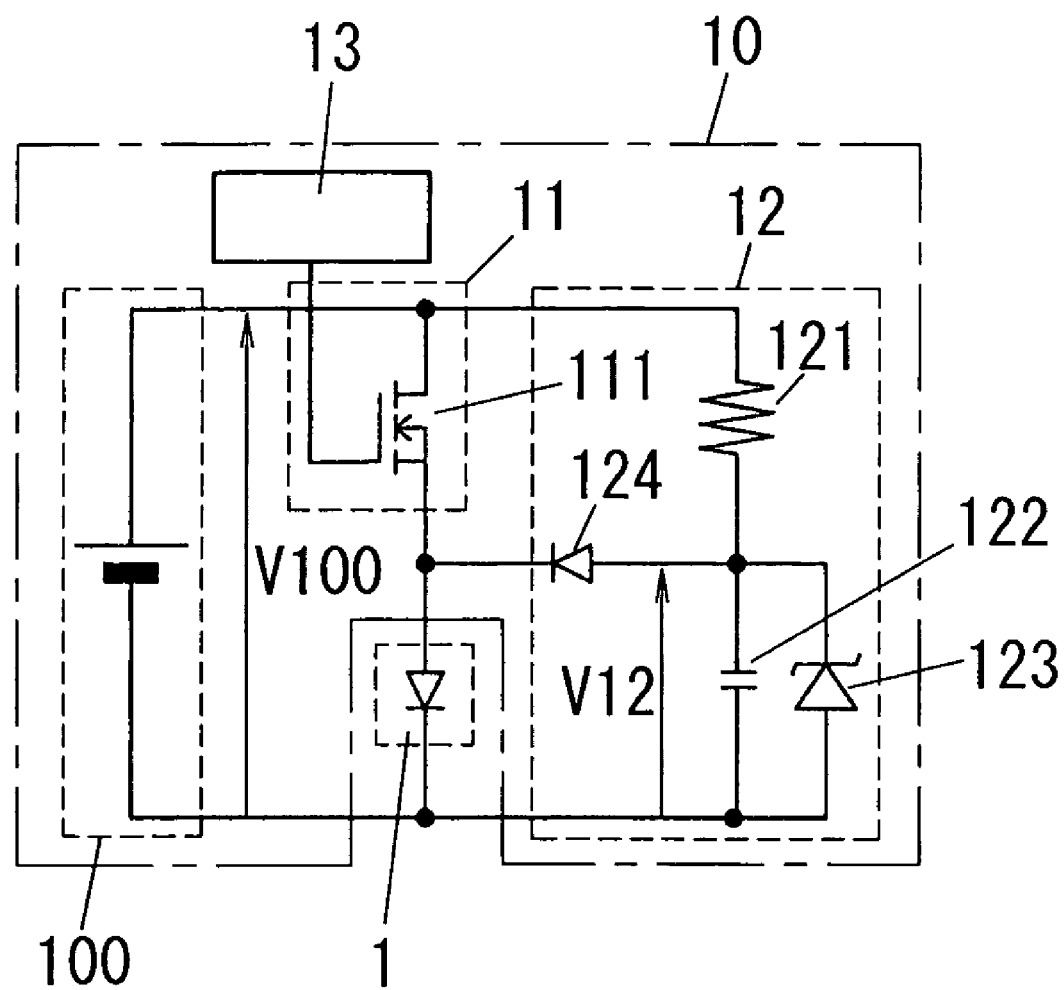
FIG. 1 is a circuit diagram of a first embodiment according to the present invention.

FIG. 1 shows a first embodiment according to the present invention, namely lighting apparatus. The apparatus is equipped with at least one organic EL element (OLED) 1 and an OLED driver 10 for driving the element 1.

The organic EL element 1 is formed of an emission layer (an organic thin film) and a pair of electrodes between which the layer is sandwiched from the both surfaces of the layer. The element 1 emits light when electrons injected from one electrode as a cathode recombine with holes injected from other electrode as an anode in the layer.

The OLED driver 10 has a direct-current power source that is formed of a main power circuit 100, a first voltage supply circuit 11 and a second voltage supply circuit 12 as well as having a dimmer 13. The driver also generates square-wave voltage of which polarity is not inverted to apply the voltage across the element 1.

The main power circuit 100 is a direct-current power source and generates a first voltage V100 that is approximately equal to (emission) drive voltage of the element 1.

The first voltage supply circuit 11 is configured to supply the element 1 with the voltage from the circuit 100 in accordance with a signal from the dimmer 13 (a turn-on (High) signal). For example, the circuit 11 is formed of a switching element (e.g., MOSFET) 111, and is connected in series with the element 1 while the series combination of the elements 111 and 1 is connected in parallel with the circuit 100.

The second voltage supply circuit 12 is configured to generate second voltage V12 based on the first voltage V100 across the circuit 100 and also to supply the voltage V12 to the element 1. The second voltage is lower than the first voltage V100 and higher than barrier voltage of the element 1. The second voltage is supplied to the element 1 during supply of a turn-off (Low) signal from the dimmer 13 to the circuit 11. For example, the circuit 12 is formed of a resistor 121, a capacitor 122, a Zener diode 123 and a diode 124. The capacitor 122 is connected in series with the resistor 121, while the series combination of the resistor 121 and the capacitor 122 is connected in parallel with the circuit 100. The diode 123 is connected in parallel with the capacitor 122. The diode 123 also receives the voltage V100 together with the capacitor 122 to regulate so that the voltage across the capacitor 122 becomes equal to the voltage V12 (=Zener voltage across the diode 123). The diode 124 is connected between the junction of the elements 111 and 1 and the junction of the resistor 121 and the capacitor 122. The diode 124 is also conducted during the supply of the turn-off signal from the dimmer 13 to the circuit 11 to supply the element 1 with the voltage V12 across the capacitor 122.

Figure 2:
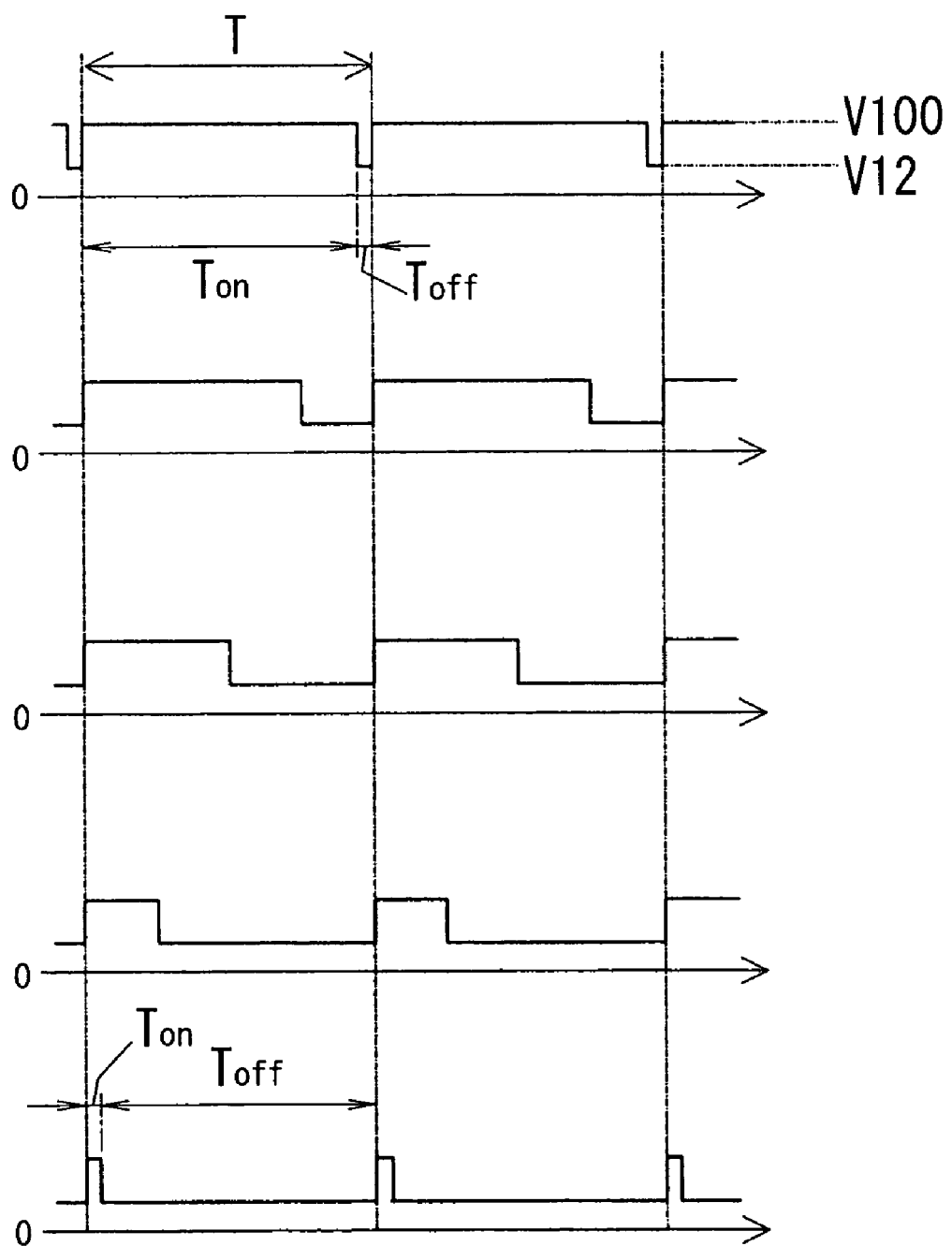
FIG. 2 is an explanatory diagram of operation of the first embodiment.

As shown in FIG. 2, the dimmer 13 controls the element 111 of said direct-current power source so as to change a ratio of a first term Ton to a second term Toff to dimm the element 1. The term Ton is a period of time for which the first voltage V100 is applied to the element 1, while the term Toff is a period of time for which the second voltage V12 is applied to the element 1. In the first embodiment, the dimmer 13 also changes the ratio while controlling so that a sum T of the terms Ton and Toff is kept constant.

The operation of the first embodiment is explained. In case that the voltage across the capacitor 122 is the voltage V12, when the dimmer 13 supplies the element 111 with a turn-on signal during a term Ton, the circuit 11 applies the voltage V100 of the circuit 100 to the element 1. Accordingly, the element 1 emits light during the term Ton. When the dimmer 13 supplies the element 111 with a turn-off signal during the term Toff after the term Ton, the circuit 11 stops supplying the voltage V100 to the element 1. The diode 124 of the circuit 12 is also conducted and then the circuit 12 applies the voltage V12 to the element 1. Accordingly, during the term Toff, the element 1 stops emitting light while operating at the second voltage V12. Similarly, the dimmer 13 alternately supplies turn on and off signals to the element 111. As a result, the element 1 is driven with the square-wave voltage of which polarity is not inverted, and operates at light output corresponding to the ratio of the term Ton to the term Toff of the square-wave voltage. Subsequently, the dimmer 13 lowers the ratio and then the light output falls, whereas the dimmer 13 raises the ratio and then the light output rises.

In case of the first embodiment, the element 1 is supplied with the voltage V12 that is lower than (emission) drive voltage of the element 1 and higher than barrier voltage of the element 1 during the term Toff. Thereby, it is possible to improve response of the element 1 with respect to the voltage V100 when the term Toff is switched to the term Ton. Therefore, a frequency of voltage periodically applied to the element 1 can be raised without reducing luminance of the element 1. And for example, by setting the frequency of the voltage to a higher frequency than the audio frequency, visible flicker and noise can be prevented.

Figure 3:
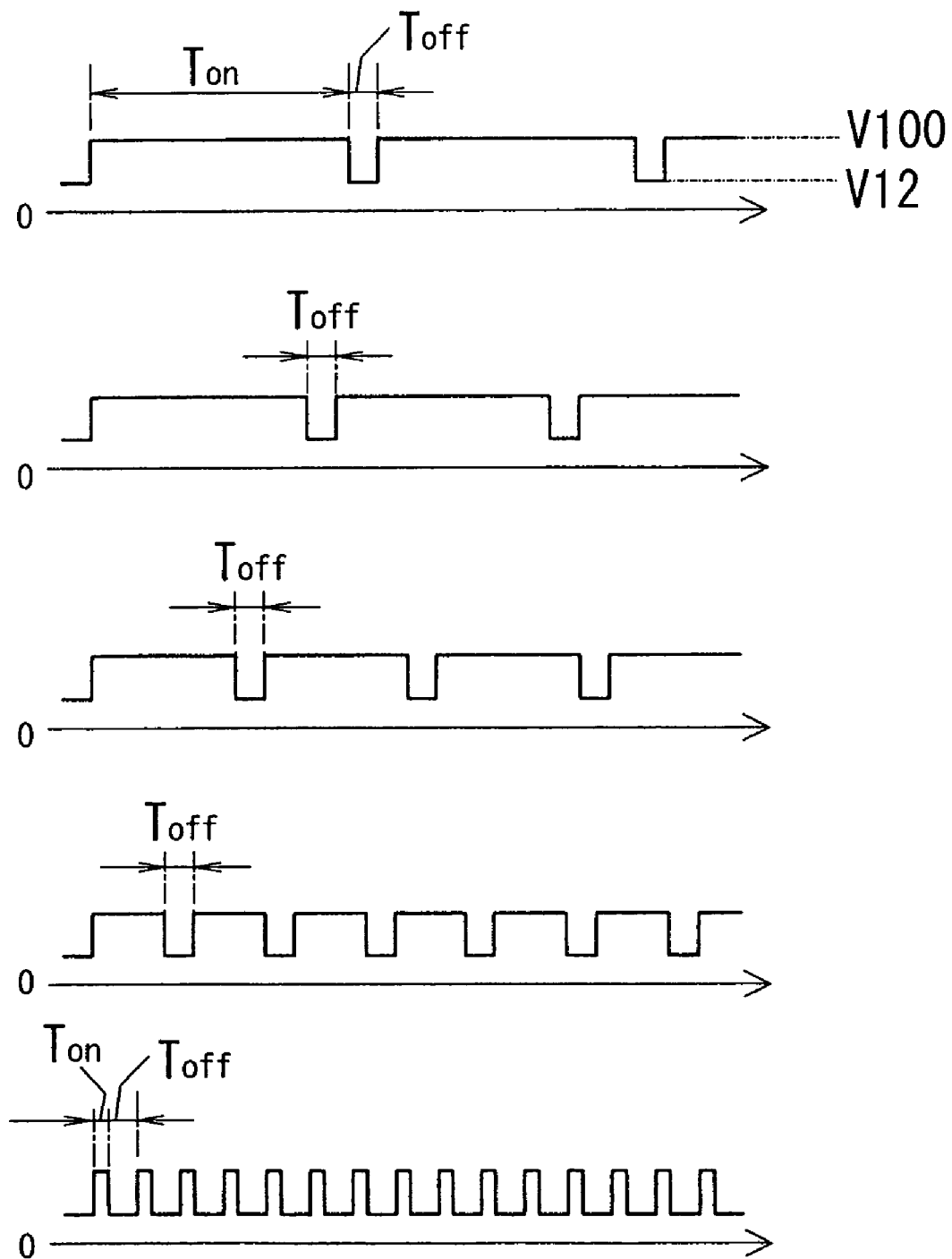
FIG. 3 is an explanatory diagram of operation of an alternate embodiment.

In an alternate embodiment, as shown in FIG. 3, the dimmer 13 changes the ratio of the term Ton to the term Toff while keeping the term Toff constant. In this structure, response of the element 1 can be improved as well.

Figure 4:
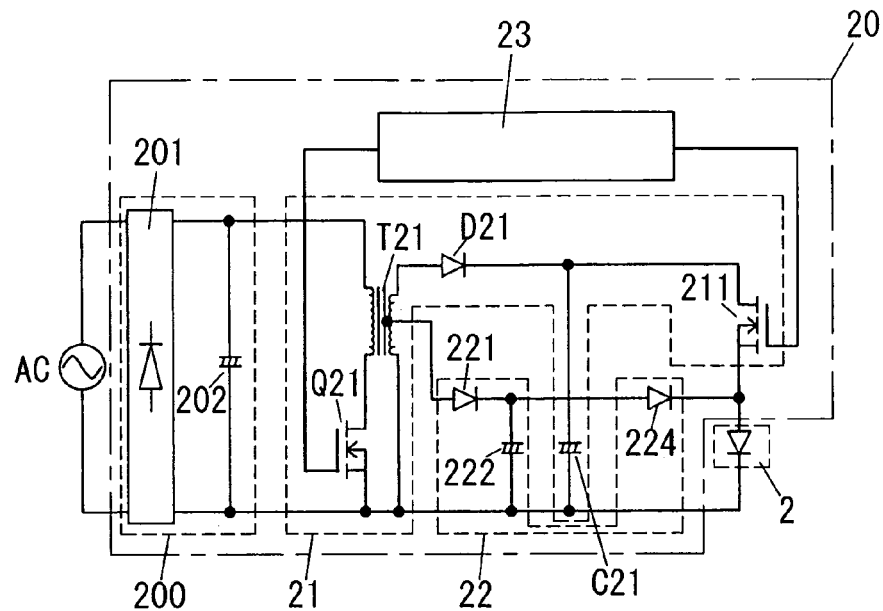
FIG. 4 is a circuit diagram of a modified embodiment (a second embodiment)

The present invention is not limited to the OLED driver 10 formed of each circuit as shown in FIG. 1. For example, the invention may be an OLED driver 20 as shown in FIG. 4. This driver has a direct-current power source formed of a main power circuit 200, a first voltage supply circuit 21 and a second voltage supply circuit 22 as well as having a dimmer 23. The driver 20 also drives at least one organic EL element 2 like that in FIG. 1. The driver 20 in the modified embodiment is now explained as a second embodiment of the present invention.

The main power circuit 200 is formed of a diode bridge 201 as a full wave rectifier that rectifies alternating-current power of a commercial power source AC into pulsating direct current power; and a smooth capacitor 202 that smoothes voltage of the pulsating direct current power. This circuit generates higher voltage than the (emission) drive voltage of the element 2.

The first voltage supply circuit 21 is configured to convert the voltage across the capacitor 202 into said first voltage in accordance with control of the dimmer 23 (a PWM control signal and a turn-on signal) and then to apply the first voltage to the element 2. In the example of FIG. 4, the circuit 21 is a well-known forward converter for voltage step down that is formed of switching elements (e.g., MOSFETs) 211 and Q21, a transformer T21, a diode D21 and a smooth capacitor C21. The transformer T21 has a secondary winding with an intermediate tap utilized by the second voltage supply circuit 22 in addition to a primary winding. The element 211 is connected in series with the element 2, while the series combination of the elements 211 and 2 is connected in parallel with the capacitor C21. Since the other arrangement is the same as the well-known forward converter, the detailed explanation is not described.

The second voltage supply circuit 22 is configured to convert the voltage across the capacitor 202 into said second voltage in accordance with control of the dimmer 23 (a PWM control signal and a turn-off signal) and then to apply the second voltage to the element 2. In the example of FIG. 4, the circuit 22 is formed of a diode 221, a smooth capacitor 222 and a diode 224. The anode of the diode 221 is connected with the tap. The positive and negative terminals of the capacitor 222 are respectively connected with the cathode of the diode 221 and the low-side end of the secondary winding. The anode and cathode of the diode 224 are respectively connected with the positive terminal of the capacitor 222 and the anode of the element 2.

The dimmer 23 controls the elements 211 and Q21 of said direct-current power source so as to change a ratio of a first term for supplying the element 2 with the first voltage to a second term for supplying the element 2 with the second voltage and then to dimm the element 2 (cf. FIG. 2 or 3). In case of the first term, the dimmer 23 supplies the control terminal (gate) of the element Q21 with a PWM control signal so as to convert the voltage across the capacitor 202 into the first voltage to keep the voltage across the capacitor C21 at the first voltage. The dimmer also supplies the control terminal (gate) of the element 211 with a turn-on signal so as to supply the element 2 with the voltage across the capacitor C21 (i.e., the first voltage). In case of the second term, the dimmer 23 supplies a turn-off signal to the control terminal of the element 211. The dimmer also supplies the control terminal of the element Q21 with a PWM control signal so as to convert the voltage across the capacitor 202 into the second voltage to keep the voltage across the capacitor 222 at the second voltage.

The operation of the second embodiment is now explained. During a first term, the dimmer 23 supplies the element Q21 with a PWM control signal so as to convert the voltage across the capacitor 202 into the first voltage to keep the voltage across the capacitor C21 at the first voltage. The dimmer also supplies the element 211 with a turn-on signal so as to supply the element 2 with the voltage across the capacitor C21. Accordingly, the element 2 emits light during the first term. During the second term after the first term, the dimmer 23 supplies a turn-off signal to the element 211. The dimmer also supplies the element Q21 with a PWM control signal so as to convert the voltage across the capacitor 202 into the second voltage to keep the voltage across the capacitor 222 at the second voltage. Accordingly, during the second term, the element 2 stops emitting light while operating at the second voltage. Similarly, the dimmer 23 alternately repeats the operation of the first term and the operation of the second term. As a result, the element 2 is driven with the square-wave voltage of which polarity is not inverted, and operates at light output corresponding to the ratio of the first term to the second term. Subsequently, the dimmer 23 lowers the ratio and then the light output falls, whereas the dimmer 23 raises the ratio and then the light output rises.

In case of the second embodiment, the inductance elements (transformer T21) can be downsized by raising the frequency of the square-wave voltage in addition to advantage like the first embodiment.

Figure 5:
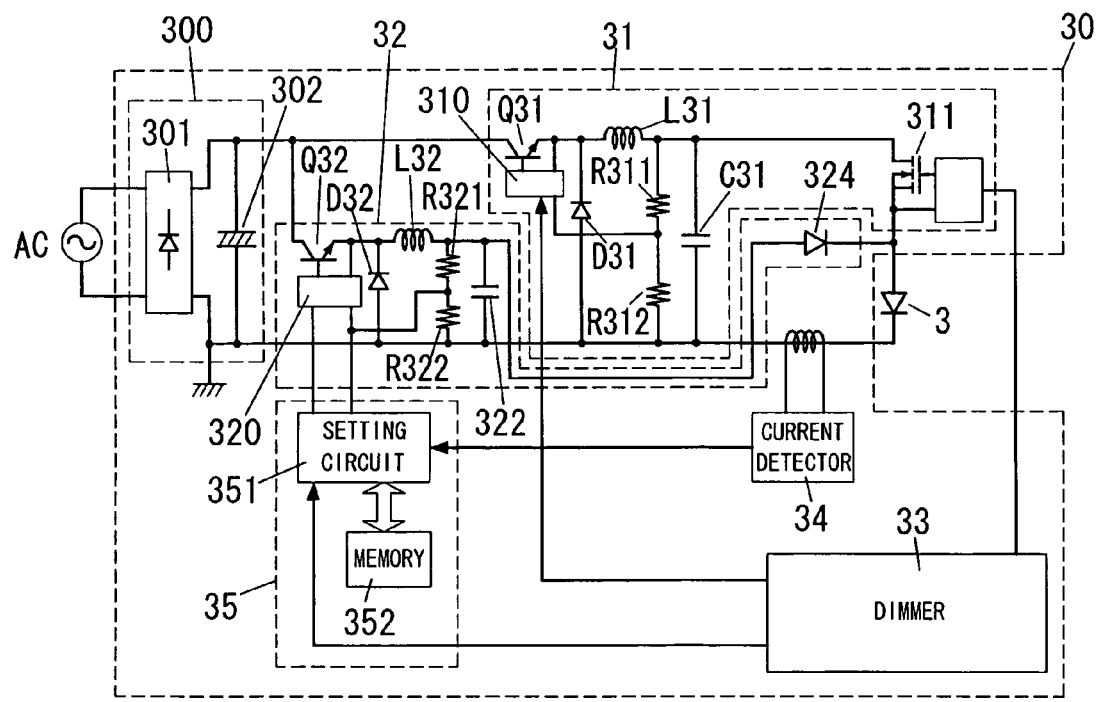
FIG. 5 is a circuit diagram of a third embodiment according to the present invention.

FIG. 5 shows a third embodiment according to the present invention, namely lighting apparatus. The apparatus has at least one organic EL element (OLED) 3 and an OLED driver 30 for driving the element 3.

The OLED driver 30 has a direct-current power source that is formed of a main power circuit 300, a first voltage supply circuit 31 and a second voltage supply circuit 32 as well as having a dimmer 33, a current detector 34 and a second voltage adjuster 35. The driver generates square-wave voltage of which polarity is not inverted to apply the voltage to the element 3.

The main power circuit 300 is formed of a diode bridge 301 as a full wave rectifier that rectifies alternating-current power of a commercial power source AC into pulsating direct current power; and a smooth capacitor 302 that smoothes voltage of the pulsating direct current power. The circuit 300 generates higher voltage than the (emission) drive voltage of the element 3.

The first voltage supply circuit 31 is configured to convert the voltage across the capacitor 302 into first voltage to apply the first voltage to the element 3 in accordance with control of the dimmer 33 (a set signal for setting the first voltage to the reference voltage of the circuit 31 and a turn-on signal). In the example of FIG. 5, the circuit 31 is a well-known switching regulator. This regulator is formed of a switching element (e.g., a MOSFET) 311, a switching element (e.g., a bipolar transistor) Q31, a diode D31, an inductor L31, a capacitor C31, resistors R311 and R312, and a control circuit 310. The element 311 is connected in series with the element 3, while the series combination of the elements 311 and 3 is connected in parallel with the capacitor C31 as the output end of the regulator. The circuit 310 detects output voltage (voltage across the capacitor C31) through the output detector formed of the resistors R311 and R312, and turns the element Q31 on and off so that the output voltage agrees with reference voltage (first voltage). The reference voltage is set through the set signal from the dimmer 33. Since the other arrangement is the same as the well-known regulator, the detailed explanation is not described.

The second voltage supply circuit 32 is configured to convert the voltage across the capacitor 302 into second voltage to apply the second voltage to the element 3 in accordance with control of the second voltage adjuster 35 (a set signal for setting the second voltage to the reference voltage of the circuit 32). In the example of FIG. 5, the circuit 32 is a well-known switching regulator. This regulator is formed of a capacitor 322, a diode 324, a switching element (e.g., a bipolar transistor) Q32, a diode D32, an inductor L32, resistors R321 and R322, and a control circuit 320. The anode and the cathode of the diode 324 are connected with the positive terminal of the capacitor 322 as the output end of the regulator and the anode of the element 3, respectively. The circuit 320 detects output voltage (voltage across the capacitor 322) through the output detector formed of the resistors R321 and R322, and turns the element Q32 on and off so that the output voltage agrees with reference voltage (second voltage). This reference voltage is set through the set signal from the adjuster 35. Since the other arrangement is the same as the well-known regulator, the detailed explanation is not described.

The dimmer 33 controls the elements 311 and Q31 of said direct-current power source and the adjuster 35 so as to change a ratio of a first term for supplying the element 3 with the first voltage to a second term for supplying the element 3 with the second voltage and then to dimm the element 3 (cf. FIG. 2 or 3). In case of the first term, the dimmer 33 supplies the circuit 310 with the set signal so as to convert the voltage across the capacitor 302 into the first voltage to keep the voltage across the capacitor C31 at the first voltage. The dimmer also supplies the control terminal (gate) of the element 311 with a turn-on signal so as to supply the element 3 with the voltage across the capacitor C31 (i.e., the first voltage). In case of the second term, the dimmer 33 supplies a turn-off signal to the control terminal (gate) of the element 311. The dimmer also supplies the adjuster 35 with a trigger signal so as to convert the voltage across the capacitor 302 into the second voltage to keep the voltage across the capacitor 322 at the second voltage. Since the other arrangement is the same as the well-known regulator, the detailed explanation is not described.

The current detector 34 includes a current sensing coil located at a passage of electric current through the element 3, and detects an electric current flowing through the element 3 with the coil.

Figure 6:
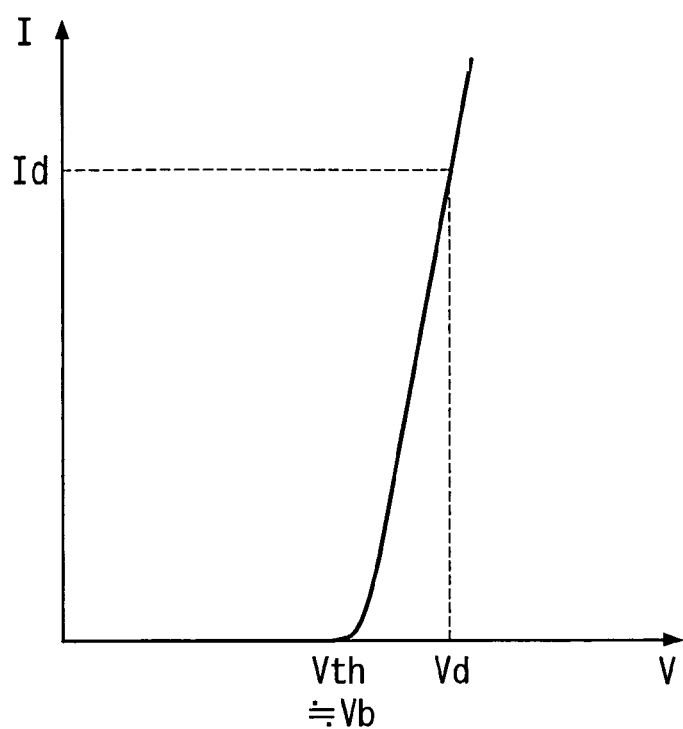
FIG. 6 is an explanatory diagram of operation of a second voltage adjuster in the third embodiment.
Figure 7:
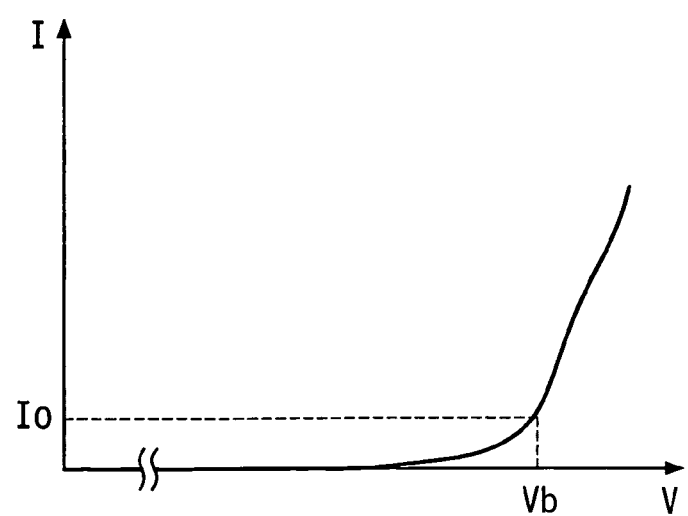
FIG. 7 is a part-enlarged diagram of FIG. 6.

The second voltage adjuster 35 is configured to calculate the second voltage and also to set the second voltage to the reference voltage of the circuit 32 in accordance with a trigger signal from the dimmer 33. The second voltage is calculated based on an electric current detected with the detector 34 and voltage detected with the resistors R321 and R322. In the example of FIG. 5, the adjuster 35 has a setting circuit 351 made up of a micon and so on, and a storage device (memory) 352. Organic EL elements have dispersion among the organic EL elements in barrier voltage in general. On account of this, if the second voltage is set to the minimum voltage of each barrier voltage, the influence of such dispersion can be avoided. But the response of each organic EL element having barrier voltage higher than the minimum voltage becomes bad. Accordingly, as shown in FIGS. 6 and 7, when initially activated, the adjuster 35 gradually raises the voltage across the capacitor 322 through the circuit 320. The adjuster then detects the voltage across the capacitor 322 through the resistors R321 and R322 at a point in time at which an electric current detected with the detector 34 agrees with a given electric current Io. And the adjuster 35 calculates the second voltage based on the detected voltage and stores the value of the second voltage in the memory 352. In accordance with a trigger signal from the dimmer 33, the adjuster 35 also retrieves the value of the second voltage from the memory 352 to supply the circuit 320 with the set signal for setting the second voltage to the reference voltage of the circuit 32. However, not limited to this, the adjuster 35 may calculate the second voltage whenever activated.

The operation of the third embodiment is now explained. When initially activated, the adjuster 35 gradually raises the voltage across the capacitor 322 through the circuit 320. The adjuster then detects the voltage across the capacitor 322 through the resistors R321 and R322 at a point in time at which the electric current detected with the detector 34 agrees with the electric current Io. The adjuster 35 then calculates the second voltage based on the detected voltage and stores the value of the second voltage in the memory 352.

Subsequently, during the first term, the dimmer 33 supplies the circuit 310 with a set signal so as to convert the voltage across the capacitor 302 into the first voltage to keep the voltage across the capacitor C31 at the first voltage. The dimmer also supplies the element 311 with a turn-on signal so as to supply the element 3 with the voltage across the capacitor C31. Accordingly, the element 3 emits light during the first term. During the second term after the first term, the dimmer 33 supplies a turn-off signal to the element 311. The dimmer also supplies the adjuster 35 with a trigger signal so as to convert the voltage across the capacitor 302 into the second voltage to keep the voltage across the capacitor 322 at the second voltage. Thereby, the adjuster 35 supplies the circuit 320 with a set signal for setting the second voltage to the reference voltage of the circuit 32, and the circuit 320 turns the element Q32 on and off in accordance with the set signal. Accordingly, during the second term, the element 3 stops emitting light while operating at the second voltage. Similarly, the dimmer 33 alternately repeats the operation of the first term and the operation of the second term. As a result, the element 3 is driven with the square-wave voltage of which polarity is not inverted, and operates at light output corresponding to the ratio of the first term to the second term. Subsequently, the dimmer 33 lowers the ratio and then the light output falls, whereas the dimmer 33 raises the ratio and then the light output rises.

In case of the third embodiment, in addition to the advantage like the first embodiment, the response of the element 3 can be optimized and it is possible to more raise a frequency of voltage periodically applied to the element 3.

Although the present invention has been described with reference to certain preferred embodiments, numerous modifications and variations can be made by those skilled in the art without departing from the true spirit and scope of this invention. For example, the lighting apparatus of the present invention may have two or more organic EL elements which are connected in series or parallel with each other.

The invention claimed is:

1. An OLED driver for driving at least one organic electroluminescence element, comprising:
   a direct-current power source that alternately applies a first voltage and a second voltage to the element, said first voltage being approximately equal to a drive voltage of the element, said second voltage being lower than the first voltage and higher than a barrier voltage of the element; and
   a dimmer that controls the direct-current power source so as to change a ratio of a first term to a second term to dim the element, said first term being a period of time for which the first voltage is applied to the element, said second term being a period of time for which the second voltage is applied to the element.

2. The OLED driver of claim 1, wherein the dimmer controls the direct-current power source so that a sum of the first and second terms is kept constant.

3. A lighting apparatus, comprising the OLED driver and the at least one organic electroluminescence element of claim 2.

4. The OLED driver of claim 1, wherein the dimmer controls the direct-current power source so as to keep the second term constant.

5. A lighting apparatus, comprising the OLED driver and the at least one organic electroluminescence element of claim 4.

6. The OLED driver of claim 1, further comprising a means for calculating the second voltage based on a voltage applied to the element and an electric current flowing through the element when the element emits light.

7. A lighting apparatus, comprising the OLED driver and the at least one organic electroluminescence element of claim 6.

8. A lighting apparatus, comprising the OLED driver and the at least one organic electroluminescence element claim 1.

* * * * *